United States Patent
Xu et al.

(10) Patent No.: US 9,701,897 B2
(45) Date of Patent: Jul. 11, 2017

(54) MATERIALS AND METHODS FOR DISPERSING NANO PARTICLES IN MATRICES WITH HIGH QUANTUM YIELDS AND STABILITY

(71) Applicant: KONINKLIJKE PHILIPS N.V., Eindhoven (NL)

(72) Inventors: Shu Xu, Shanghai (CN); Rifat Ata Mustafa Hikmet, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 343 days.

(21) Appl. No.: 14/373,497

(22) PCT Filed: Jan. 25, 2013

(86) PCT No.: PCT/IB2013/050642
§ 371 (c)(1),
(2) Date: Jul. 21, 2014

(87) PCT Pub. No.: WO2013/114254
PCT Pub. Date: Aug. 8, 2013

(65) Prior Publication Data
US 2014/0369024 A1   Dec. 18, 2014

Related U.S. Application Data

(60) Provisional application No. 61/594,436, filed on Feb. 3, 2012.

(51) Int. Cl.
C08J 3/00      (2006.01)
C09K 11/02    (2006.01)
(Continued)

(52) U.S. Cl.
CPC .............. C09K 11/025 (2013.01); C08F 2/44 (2013.01); C08G 77/382 (2013.01); C08K 9/08 (2013.01);
(Continued)

(58) Field of Classification Search
CPC ....... C09K 11/025; C09K 11/883; F21V 9/08; Y10S 977/774; Y10S 977/779; Y10S 977/90; B82Y 40/00
See application file for complete search history.

(56) References Cited

U.S. PATENT DOCUMENTS 6,635,903 B2 * 10/2003 Kato ..................... H01L 33/505
                                                    257/100
8,153,022 B2 *  4/2012 Ryowa ................... C09K 11/02
                                                    252/301.33

(Continued)

FOREIGN PATENT DOCUMENTS

JP     2005128539 A    5/2005
JP     2011080067 A    4/2011
(Continued)

OTHER PUBLICATIONS

EPO as ISA, PCT/IB2013/050642 filed Jan. 25, 2013, "International Search Report and Written Opinion" mailed Oct. 14, 2013, 11 pages.
(Continued)

Primary Examiner — Carol M Koslow

(57) ABSTRACT

The invention provides a process for the production of a solid polymer with embedded luminescent nano particles, comprising (1) mixing luminescent nano particles with an outer surface coated with capping molecules comprising a first functional group and a second functional group and a precursor of a solid polymer, and (2) allowing the solid polymer to be formed; wherein the first functional group is configured to bind to the outer surface of the quantum dot
(Continued)

and the second functional group is miscible with the precursor of the solid polymer and/or is able to react with the precursor of the solid polymer. The invention also provides a luminescent polymeric article comprising a solid polymer with in the polymer article embedded luminescent nano particles with an outer surface coated with capping molecules comprising a first functional group and a second functional group.

17 Claims, 3 Drawing Sheets

(51) Int. Cl.
| | |
|---|---|
| *C08F 2/44* | (2006.01) |
| *C08K 9/08* | (2006.01) |
| *C08G 77/382* | (2006.01) |
| *C09K 11/88* | (2006.01) |
| *F21V 9/08* | (2006.01) |
| *C08G 77/14* | (2006.01) |
| *B82Y 20/00* | (2011.01) |
| *B82Y 40/00* | (2011.01) |

(52) U.S. Cl.
CPC .............. *C09K 11/883* (2013.01); *F21V 9/08* (2013.01); *B82Y 20/00* (2013.01); *B82Y 40/00* (2013.01); *C08G 77/14* (2013.01); *Y10S 977/774* (2013.01); *Y10S 977/779* (2013.01); *Y10S 977/90* (2013.01)

(56) References Cited

U.S. PATENT DOCUMENTS

| | | | | |
|---|---|---|---|---|
| 8,552,417 | B2* | 10/2013 | Taylor | .................... B82Y 30/00 257/13 |
| 9,196,682 | B2* | 11/2015 | Jang | ........................ B82Y 10/00 |
| 2001/0040232 | A1 | 11/2001 | Bawendi et al. | |
| 2009/0065742 | A1 | 3/2009 | Shih et al. | |
| 2009/0173957 | A1* | 7/2009 | Brunner | ............. C09K 11/7701 257/98 |
| 2011/0084250 | A1 | 4/2011 | Jang | |
| 2011/0240960 | A1 | 10/2011 | Kim | |

FOREIGN PATENT DOCUMENTS

| | | |
|---|---|---|
| JP | 2011142336 A | 7/2011 |
| WO | 2011036447 A1 | 3/2011 |

OTHER PUBLICATIONS

First Office Action issued Nov. 2, 2015, Chinese Patent Application No. 201380006483.X, 12 pages.
Grant Notification dated Jun. 6, 2016, Chinese Patent Application No. 201380006483.X, 4 pages.
Second Office Action issued Mar. 7, 2016, China Application No. 201380006483.X, 8 pages.
JP Office Action mailed Nov. 29, 2016, Japan Application No. 2014-555354, 12 pages.
RU Office Action mailed Jan. 11, 2017, Russian Application No. 2014135769, 8 pages.

* cited by examiner

MATERIALS AND METHODS FOR DISPERSING NANO PARTICLES IN MATRICES WITH HIGH QUANTUM YIELDS AND STABILITY

CROSS-REFERENCE TO PRIOR APPLICATIONS

This application is the U.S. National Phase application under 35 U.S.C. §371 of International Application No. PCT/IB2013/050642, filed on Jan. 25, 2013, which claims the benefit of U.S. Patent Application No. 61/594,436, filed on Feb. 3, 2012. These applications are hereby incorporated by reference herein.

FIELD OF THE INVENTION

The invention relates to a process for the production of a solid polymer with in the polymer embedded luminescent nano particles, to a polymeric article thus obtained, and to a lighting unit comprising such polymer or polymeric article.

BACKGROUND OF THE INVENTION

The use of nano particles, such as quantum dots (QD), for lighting applications is known in the art. US20110240960, for instance, describes a light emitting device comprising a light emitting source, a first quantum dot wavelength converter disposed above the light emitting source, the first quantum dot wavelength converter comprising, a plurality of first quantum dots for generating wavelength-converted light by converting wavelength of light from the light emitting source, a first dispersive medium embedding the first quantum dots dispersively therein, and a first sealer for sealing the entire outside surface of dispersive medium embedding the first quantum dots in a pack.

A first encapsulant is applied for encapsulating the entire outside surface of the first quantum dot wavelength converter. Further, a second quantum dot wavelength converter is disposed above the first quantum dot wavelength converter, the second quantum dot wavelength converter comprising a plurality of second quantum dots for generating wavelength-converted light by converting wavelength of light from the light emitting source, a second dispersive medium embedding the second quantum dots dispersively therein, and a second sealer for sealing the entire outside surface of the second dispersive medium embedding the second quantum dots in a pack, wherein the first quantum dot wavelength converter, the second quantum dot wavelength converter and the light emitting source are spaced apart from each other. The second encapsulant is disposed on the entire outside surface of the second quantum dot wavelength converter and for encapsulating the entire outside surface of the second quantum dot wavelength converter. Further, the light emitting source is a light emitting diode or a laser diode.

SUMMARY OF THE INVENTION

Nano particles, such as quantum dots (QDs), have shown to be highly interesting in lighting applications. They could e.g. serve as inorganic phosphor in converting blue light to other colors and have the advantage of a relative narrow emission band and the advantage of color tunable by the size of the QDs to be able to obtain high quality pure white light.

Up to now, embedding of nano particles in many types of polymers appears to lead to aggregation of the nano particles. The reported capping molecules have rather low photochemical stability and the capping molecules are usually sensitive in air.

Hence, it is an aspect of the invention to provide an alternative nano particle—polymer system, especially a polymer quantum dot system. Especially, it is an aspect of the invention to provide an alternative process for the production of such polymer with embedded nano particles. Further, it is an aspect of the invention to provide an alternative polymeric article with nano particles embedded therein. Yet, it is a further aspect to provide an alternative lighting unit comprising such polymer with embedded QDs. Preferably, the alternative process and/or alternative polymeric article and/or alternative lighting unit at least partly obviate one or more of above-described (and also further below described) drawbacks of prior art solutions.

Amongst others, herein it is suggested to use high Tg, such as at least 120° C., even more especially at least 150° C., yet even more especially at least 200° C., and photochemical stable polymers, e.g. silicone containing polymer, as a matrix material with high stability. Silicon containing polymers such as PDMS and Silres (silicone resins) may have a much higher thermal stability and/or light transparency than prior art solutions. However QDs with conventional surface capping molecules do not disperse in silicones and show aggregation leading to quenching. Hence, it is still a challenge to mix nano particles into such polymers, especially silicon containing polymers. The phase separation between nano particles and polymers cause agglomeration of QDs and dramatically decrease the quantum yields and light transparency of the nano particles/polymer mixture.

Herein, in order to get well dispersed QD layers in silicones it is suggested to use capping molecules or ligands which can attach themselves to the surface of QDs. A group of new matrix compatible, such as silicone compatible, capping molecules have been developed. These capping molecules could easily cap onto QDs and bring them to form uniform QDs/silicone polymer composites (via simple ligands exchange approaches). These capping molecules are composed of two parts; one part combines with the exposed atoms on crystal surface of the QDs and the other part has a compatibility with the (e.g. silicone) matrix. By surface modification of nano particles, the nano particles could be easily mixed into the (silicone) matrix containing polymers, such as PDMS and Silres, without phase separation. The new matrices could form highly transparent thin films. The films have high thermal stability and could be used as novel light converting phosphor. By choosing the matched PDMS/Silres and surface capping molecules for nano particles, it is possible to mix most of common nano particles homogeneously into any specified PDMS/Silres matrix. The formed nano particles/silicon matrix thin films have high light transparency and comparable stability as the nano particles in pure inorganic matrices. The nano particles/silicon polymer composites have overwhelming advantages comparing to other nano particles—polymer matrices which have been tried (in the laboratory).

Hence, in a first aspect, the invention provides a process for the production of a solid polymer (article) with in the polymer embedded nano particles, especially luminescent nano particles, the process comprising the process elements:

(1) mixing (i) nano particles, especially luminescent nano particles, with an outer surface coated with capping molecules comprising a first functional group and a second functional group and (ii) a precursor of a solid polymer (herein also indicated as "polymer precursor"), and (2) allowing the solid polymer to be formed, thereby producing the solid polymer with embedded nano particles; wherein the first functional group is configured to bind to the outer surface of the quantum dot and wherein the second functional group has one or more functions selected from the group consisting of (a) being miscible with the precursor of the solid polymer and (b) being able to react with the precursor of the solid polymer.

Especially, the nano particles are luminescent nano particles, which may especially be configured to provide, upon excitation by UV and/or blue light, luminescence in at least part of the visible part of the spectrum. Hence, these particles are herein also indicated as luminescent nano particles.

Such polymer, obtainable by such process, may be used as or in a polymeric article and appears to show luminescence with a high quantum yield and stability. Further, the polymer may be relatively temperature and/or photochemical stable, especially when silicone based polymers (and capping molecules) are applied. Further, with this process, nano particles may be dispersed in the polymer in a relative even way, without the substantial disadvantage of agglomeration.

Hence, in a further aspect, the invention also provides a solid polymer or polymeric article, obtainable by the process of the invention. Especially, the invention also provides a (luminescent) polymeric article comprising a solid polymer with in the polymer article embedded (luminescent) nano particles with an outer surface coated with capping molecules comprising a first functional group and a second functional group.

As these luminescent materials may well be applied in lighting devices, the invention provides in yet a further aspect a lighting unit comprising (i) a light source configured to generate light source light and (ii) a light converter configured to convert at least part of the light source light into converter light, wherein the light converter comprises the solid polymer obtainable according to the process as defined herein or the polymeric article as defined herein.

The luminescent nano particles may for instance comprise group II-VI compound semiconductor nano particles selected from the group consisting of CdS, CdSe, CdTe, ZnS, ZnSe, ZnTe, HgS, HgSe, HgTe, CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, CdZnSeS, CdZnSeTe, CdZnSTe, CdHgSeS, CdHgSeTe, CdHgSTe, HgZnSeS, HgZnSeTe and HgZnSTe. In another embodiment, the luminescent nano particles may for instance be group III-V compound semiconductor nano particles selected from the group consisting of GaN, GaP, GaAs, AlN, AlP, AlAs, InN, InP, InAs, GaNP, GaNAs, GaPAs, AlNP, AlNAs, AlPAs, InNP, InNAs, InPAs, GaAlNP, GaAlNAs, GaAlPAs, GaInNP, GaInNAs, GaInPAs, InAlNP, InAlNAs, and InAlPAs. In yet a further embodiment, the luminescent nano particles may for instance be I-III-VI2 chalcopyrite-type semiconductor nano particles selected from the group consisting of $CuInS_2$, $CuInSe_2$, $CuGaS_2$, $CuGaSe_2$, $AgInS_2$, $AgInSe_2$, $AgGaS_2$, and $AgGaSe_2$. In yet a further embodiment, the luminescent nano particles may for instance be I-V-VI2 semiconductor nano particles, such as selected from the group consisting of $LiAsSe_2$, $NaAsSe_2$ and $KAsSe_2$. In yet a further embodiment, the luminescent nano particles may for instance be group IV-VI compound semiconductor nano crystals such as SbTe. In a specific embodiment, the luminescent nano particles are selected from the group consisting of InP, $CuInS_2$, $CuInSe_2$, CdTe, CdSe, CdSeTe, $AgInS_2$ and $AgInSe_2$. In yet a further embodiment, the luminescent nano particles may for instance be one of the group II-VI, III-V, I-III-V and IV-VI compound semiconductor nano crystals selected from the materials described above with inside dopants such as ZnSe:Mn, ZnS:Mn. The dopant elements could be selected from Mn, Ag, Zn, Eu, S, P, Cu, Ce, Tb, Au, Pb, Tb, Sb, Sn and Tl. Herein, the luminescent nano particles based luminescent material may also comprise different types of QDs, such as CdSe and ZnSe:Mn.

It appears to be especially advantageous to use II-VI nano particles. Hence, in an embodiment the semiconductor based luminescent nano particles comprise II-VI nano particles, especially selected from the group consisting of CdS, CdSe, CdTe, ZnS, ZnSe, ZnTe, HgS, HgSe, HgTe, CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, CdZnSeS, CdZnSeTe, CdZnSTe, CdHgSeS, CdHgSeTe, CdHgSTe, HgZnSeS, HgZnSeTe and HgZnSTe, even more especially selected from the group consisting of CdS, CdSe, CdSe/CdS and CdSe/CdS/ZnS.

The luminescent nano particles (without coating) may have dimensions in the range of about 2-50 nm, such as 2-20 nm, especially 2-10 nm even more especially 2-5 nm; especially at least 90% of the nano particles have dimension in the indicated ranges, respectively, (i.e. e.g. at least 90% of the nano particles have dimensions in the range of 2-50 nm, or especially at least 90% of the nano particles have dimensions in the range of 2-5 nm). Typical dots are made of binary alloys such as cadmium selenide, cadmium sulfide, indium arsenide, and indium phosphide. However, dots may also be made from ternary alloys such as cadmium selenide sulfide. These quantum dots can contain as few as 100 to 100,000 atoms within the quantum dot volume, with a diameter of 10 to 50 atoms. This corresponds to about 2 to 10 nanometers. For instance, spherical particles such as CdSe, InP, $CuInSe_2$ with a diameter of about 3 nm may be provided. The luminescent nano particles (without coating) may have the shape of spherical, cube, rods, wires, disk, multi-pods, etc., with the size in one dimension of less than 10 nm. For instance, nanorods of CdSe with the length of 20 nm and a diameter of 4 nm may be provided. Hence, in an embodiment the semiconductor based luminescent nano particles comprise core-shell nano particles. In yet another embodiment, the semiconductor based luminescent nano particles comprise dots-in-rods nano particles. A combination of different types of particles may also be applied. For instance, core-shell particles and dots-in-rods may be applied and/or combinations of two or more of the aforementioned nano particles may be applied, such as CdS and CdSe.

Hence, the above-mentioned outer surface may be the surface of a bare quantum dot or may be the surface of a coated quantum dot, such as a core-shell quantum dot, i.e. the (outer) surface of the shell.

Herein, the term "solid polymer" is used, as to indicate that the polymeric end product of the process of the invention is not a liquid or a solved polymer, but a tangible product (at room temperature (and atmospheric pressure)) in the form of for instance particles, a film, a plate, etc. Hence, in an embodiment, the polymeric article is selected from the group consisting of a coating, a self supporting layer, and a plate (which polymeric article is thus solid at room temperature, especially even up to 100° C., especially even up to 150° C., especially even up to 200° C.

Especially, the polymeric article is transmissive for light having a wavelength selected from the range of 380-750 nm. For instance, the polymeric article may be transmissive for blue, and/or green, and/or red light. Especially, the polymeric article is transmissive for at least the entire range of 420-680 nm. Especially, the polymeric article has a light transmission in the range of 50-100%, especially in the range of 70-100%, for light generated by the light source of the lighting unit (see also below) and having a wavelength selected from the visible wavelength range. In this way, the article is transmissive for visible light from the lighting unit. The transmission or light permeability can be determined by providing light at a specific wavelength with a first intensity to the material and relating the intensity of the light at that wavelength measured after transmission through the material, to the first intensity of the light provided at that specific wavelength to the material (see also E-208 and E-406 of the CRC Handbook of Chemistry and Physics, 69th edition, 1088-1989). The polymeric article may be transparent or translucent, but may especially be transparent.

The process of the invention at least comprises two process elements, which will in general be executed consecutively, with the first process element preceding the second process element. The fact that two process elements are explicitly mentioned, does not exclude the presence of one or more other process elements, which may be included in the process before the first process element, and/or between the first and the second process element, and/or after the second process element. For instance, the process of the invention may also include an exchange of existing capping molecules on the quantum nano particle with capping molecules as defined in the present invention.

The first process element includes the mixing of the coated nano particles and the precursor of the solid polymer. In the general, this could be accelerated or optimized in the presence of a solvent for both the nano particles and the polymer precursor. Herein, a solvent is considered to be a solvent when at room temperature at least 0.1 gram/1 of a species to be solved can be solved in the solvent. The solvent could be any common, preferably non-polar, solvents with preferably a boiling point lower than 120° C. For instance, the solvent could be toluene, benzene, hexane, cyclohexane, etc. The solvent could be a polar solvent. For instance, the solvent could be chloroform, acetone, acetone nitrile, ethyl acetate, petroleum ether, etc. Mixing may be done with conventional techniques. Optionally, the mixture may be heated.

The polymer precursor may comprise in an embodiment monomers for a polymer, which monomers are able to form a polymer upon polymerization. However, in another embodiment, the polymer precursor is a polymer, which is solved in the solvent. In the former embodiment, due to polymerization, the nano particles are embedded in the polymer thus formed. In the later embodiment, the solved polymer is retrieved from the solution, for instance by solvent evaporation or other techniques known in the art. The polymer is formed (again) and the nano particles are in this way embedded in the thus (re)formed polymer. This latter embodiment may be similar to crystallization techniques of polymers.

The polymer may be any kind of polymer, such as obtainable by step-growth polymerization, by chain-growth polymerization, by radical polymerization, by catalyzed polymerization, etc. Hence, the phrase "allowing the solid polymer to be formed", may for instance imply adding an initiator for polymerization and/or providing light and/or heating to the mixture to initiate polymerization, etc. The polymer may be a homopolymer, a copolymer, such as an alternating copolymer, a periodic copolymer, a statistical copolymer, a block copolymer, a grafted copolymer, or a terpolymer, etc. Especially, the polymer precursor is a precursor for a (solid) polymer selected from the group consisting of a polysiloxane, a polystyrene and a polyacrylate, especially a polysiloxane.

As indicated above, the first functional group is configured to bind to the outer surface of the quantum dot and the second functional group has one or more functions selected from the group consisting of (a) being miscible with the precursor of the solid polymer and (b) being able to react with the precursor of the solid polymer. Due to this at least dual function, the capping molecule is able to bind to the quantum dot but the capping molecule is also able to be at least partly integrated into to polymer (during formation of the solid polymer). In this way, a good dispersion of the nano particles in the polymer is possible, without aggregation. In prior art techniques, aggregation inevitable occurs. Especially, the second functional group has at least the function of being miscible with the precursor of the solid polymer. Optionally, the ligand may also react with the precursor of the solid polymer (and/or with the solid polymer in formation in the second process element). When reaction, for instance copolymers or graft copolymers may be obtained.

Hence, in an embodiment the precursor of a solid polymer comprises monomers that are able to form the polymer upon polymerization, and in another embodiment, the precursor of a solid polymer comprises a polymer; wherein the first process element involves (1) mixing (i) nano particles with the outer surface coated with capping molecules comprising the first functional group and the second functional group, (ii) the precursor of the solid polymer, and (iii) a solvent for the precursor of the solid polymer.

Therefore, the first functional group may in an embodiment comprise a metal ion serving as a coordinating center, such as Zn (especially $Zn^{2+}$) Ni (especially $Ni^{2+}$), In (like $In^{3+}$), Cd (like $Cd^{2+}$), Cu (like $Cu^+$ or preferably $Cu^{2+}$), which enables the coordination/connection with the anions—for instance S, Se, P—on the surface of a nano particle. Hence, the first functional group (of the first type of capping molecule; see also below) may comprise a metal ion with coordinating functionality.

The first functional group may in another embodiment comprise an organic group, such as amine, acid, thiol, which enables the coordination/connection to the cations—for instance Cd, Zn, In, Cu, Mg, Ag, etc.—on the surface of a nano particle.

Hence, the coating with the capping molecules can be considered to be due to the fact that the capping molecules are coordination to the outer surface of the nano particle. This may be the outer surface of a bare nano particle or the outer surface of the coating (here inorganic, in general also semi conductor) coating of the nano particle. The capping molecules may thus attach to the outer surface.

The second functional group preferably comprises at least a monomer of the polymer (precursor), although other systems that are miscible with the polymer (precursor) may also be applied. This may depend upon the miscibility. The term miscible is known in the art, but may optionally be defined as that at least 0.1 gram of a nano particles with capping molecules is miscible in 1 kg of polymer precursor and optional solvent, at room temperature (and atmospheric pressure), without phase separation between polymer precursor and nano particles (with capping molecules). Optionally, miscible may in an embodiment also be defined as that that the capping molecules of the quantum dot contain a monomer unit of the precursor polymer.

The phrase "contain a monomer of the polymer precursor" and similar phrases may in an embodiment indicate that the ligand or capping molecule comprises a monomer also used or usable as monomer building block for the polymer or the solid polymer. The phrase "contain a monomer of the polymer precursor" and similar phrases may in an embodiment also indicate that the ligand or capping molecule comprises a monomer that is similar to the monomer also used or usable as monomer building block for the polymer or the solid polymer. The phrase "contain a monomer of the polymer precursor" and similar phrases may in an embodiment further indicate that the ligand or capping molecule comprises a group that is identical or to a group of to the monomer also used or usable as monomer building block for the polymer or the solid polymer. For instance, the monomer (s) that are used (or have been used) for the formation of the polymer may contain side chains, which are similar or identical to the second functional group of the ligand. Some non-limiting examples are given below:

| Ligand or capping molecule | First functional group | Second functional group | Monomer | Matrix |
|---|---|---|---|---|
| Zn-PDMS | Zn | PDMS | PDMS monomers | PDMS |
| Zn-silane | Zn | silane such as ethoxysilane, , methoxysilane, phenyl-alkoxysilanes, etc. | Silres/PDMS monomers with ethoxysilane or methoxysilane as side group | Silres/PDMS |
| Zn-benzene | Zn | Benzene | polymer monomers with benzene as side group or styren | Silres or Polystyrene (PS) |
| Thiol-benzene | SH | Benzene | polymer monomers with benzene as side group or styren | Silres or Polystyrene (PS) |
| Zn-acrylates | Zn | Acrylate | Acrylate monomers For example: Methyl methacrylate | Poly-acrylates For example: QDs-PMMA |
| In-PDMS | In | PDMS | PDMS monomers | PDMS |
| Anilin | NH2 | benzene | Silres monomers with benzene as side group, or styrene | Silres or Polystyrene (PS) |
| Amino-silane | Amino | silane | Resin with silane as side group | Silres, PDMS, etc. |
| Carboxylic acid-PDMS | Carboxylic acid | PDMS | PDMS monomers | PDMS |
| Carboxylic amino-PDMS | Carboxylic amine | PDMS | PDMS monomers | PDMS |
| Caryboxylic thiol-PDMS | Thiol | PDMS | PDMS monenmers | PDMS |

Therefore, in an embodiment (of the process of the invention) the second functional group is selected from the group consisting a siloxane, a styrene, and an acrylate, and the solid polymer comprises a polymer selected from the group consisting of a polysiloxane, a polystyrene and an polyacrylate, respectively. The phrase "the second functional group is selected from the group consisting a siloxane, a styrene, and an acrylate" may also include embodiments wherein the second functional group includes a polysiloxane, a polystyrene or an polyacrylate, respectively (but including a relative limited number of the characterizing groups, see further below). The phrase "the solid polymer comprises a polymer selected from the group consisting of a polysiloxane, a polystyrene and an polyacrylate" may especially refer to embodiments wherein the (solid) polymer is essentially based on such polymers, respectively.

The PDMS ligand or PDMS monomer, as indicated above in the table, may of course be shorter than the polymers in PDMS matrix. This may also apply to the (other) systems mentioned above. For instance, the number of repeating units (of the characterizing group) in the ligand or capping molecule may be 1-100 monomer units, such as 2-50, such as 20-30 monomer units, especially 4-20. Hence, here the ligand comprises a limited number of characterizing groups. Silres are a kind of silicones.

For instance, in an embodiment wherein the solid polymer (herein also indicated as polymer matrix) is a silicone, the ligand or capping molecule may for instance comprise $-[-Si(CH_3)_2-O-]_n$, with n=1-100 (such as at least 2), as second functional group, for instance $NH_2-[-Si(CH_3)_2-O-]_n-CH_3$ or $ZnOOC-[-Si(CH_3)_2-O-]_n-CH_3$. One or more of the $CH_3$ side groups, for one or more of the n silicone units, may optionally be replaced by a phenyl group (i.e. benzene). More general, the capping molecule may comprise $-[-Si(R)_2-O-]_n$, with n=1-100 (such as at least 2), as second functional group, wherein the R side groups from the silicon may be identical or may differ, and may even differ from silicon to silicon within the functional group. R may for instance be selected from the group consisting of methyl, phenyl, etc. $-[-Si(R)_2-O-]$ refers to the silicone unit or silicone characterizing group (i.e. group that characterizes a silicone).

Hence, in yet a further aspect, the invention also provides a luminescent material comprising a plurality of nano particles, wherein the nano particles comprise outer surfaces coated with capping molecules, wherein the capping molecules comprise $-[-Si(R)_2-O-]_n$, with n=1-100, such as at least 2, wherein R is selected from methyl and phenyl. As indicated above, one may also indicate the silicone groups as $-[-Si(R1R2)-O-]_n$, as the R groups are not necessarily the same for one silicon, but may also differ per silicon within the group. However, in one embodiment, all R groups are either methyl or phenyl.

In yet another example, in an embodiment wherein the solid polymer (herein also indicated as polymer matrix) is a poly methylacrylate, the ligand may for instance comprise $-[-C_5O_2H_8-]_n$, with n=1-50, such as 1-20, such as at least 2, as second functional group, for instance $HSCH_2-[-C_5O_2H_8-]_n-CH_3$ or $Ni(OOC-[-C_5O_2H_8-]_nCH_3)_2$.

The number of recurring characterizing units n is especially at least 4.

Above, already some examples where given of different types of capping molecules. The capping molecules can be distinguished between those that preferentially coordinate to cations of the nano particles and those that preferentially coordinate to anions of the nano particles (at the surface of the quantum dot). Hence, preferably, the capping molecules comprise two types of capping molecules, wherein the first functional group of the first type of capping molecules may comprise a metal ion with coordinating functionality (such as with a free electron pair ready for coordinating or connect with anions) and (/or) wherein the first functional group of the second type of capping molecule has a Lewis base functionality. The first functional group of the first type of capping molecule may have in an embodiment have a Lewis acid function).

As indicated above, two types of capping molecules or ligands are preferably used: the first type of capping molecules and the second type of capping molecules. These capping molecules or ligands occupy the surface of the quantum dot and may thereby remove or reduce the dangling bonds. In this way, quantum efficiency may be increased. The capping molecules may thus provide a kind of (organic) coating.

The first type of capping molecule comprises $M^{n+}R_n$, wherein M is a metal, wherein n is at least 2, and wherein R is as indicated herein, for instance a monomer of the polymer precursor (i.e. the first type of capping molecules are metal organic molecules). Hence, the cation has a valence of two or higher. Examples of suitable cations are cations selected from the group of transition metals, especially of the group consisting of Ti, Zr, Hf, V, Nb, Ta, Cr, Mo, W, Mn, Re, Fe, Ru, Os, Co, Rh, Ir, Ni, Pd, Pt, Cu, Zn, and Cd. Especially preferred are Zn, Mg, In, and Ga. The fact that the valence n, which is preferably at least 2, such as 2, 3 or 4, also implies two or more groups R does not imply that those groups R are necessarily identical. Each group R of the first type of capping molecule may be unique. The first type of capping molecules coordinates to the anions at the surface of the quantum dot. Assuming e.g. CdSe, the first type will coordinate to Se anions. The first type of capping molecules may also be indicated as Lewis acid. The value of n is preferably (but not exclusively) 2. The first type of capping molecule or ligand may coordinate to an anion at the (outer) surface of the nano particle as the metal ion may have coordinating functionality.

The second type of capping molecule especially comprise an organic Lewis base. A Lewis base, is any species that donates a pair of electrons to a Lewis acid to form a Lewis adduct. For example, OH— and $NH_3$ are Lewis bases, because they can donate a lone pair of electrons. A Lewis acid is a molecule entity (and the corresponding chemical species) that is an electron-pair acceptor and therefore able to react with a Lewis base to form a Lewis adduct, by sharing the electron pair furnished by the Lewis base.

Herein, the Lewis base (and Lewis acid) are organic molecules, i.e. a hydrocarbon having a Lewis base moiety. Especially, the second capping molecule may be selected from the group consisting of RCN (nitrile), $RNH_2$ (primary amine), $R_2NH$ (secondary amine), RSH (thiol), and RCOOH (carboxylic acid), and amino acid, and wherein R is as indicated herein, for instance a monomer of the polymer precursor. Again, the fact that in some embodiments there may be two or more groups R in the second capping molecule does not imply that those groups R are necessarily identical. Each hydrocarbon group R of the second type of capping molecule may be unique. However, in a specific embodiment (wherein more than one group R is present in the second capping molecule), all groups R of the second type of capping molecules are identical.

This dual-surfactants modification method provides a close to 1:1 cover (or coating) of the cations and anions ions exposed on the surface of QDs, e.g. Cd- and Se- on CdSe surface and prevents the dangling bonds on the QDs surfaces. In this case, the surface coating is similar as the inorganic ZnS coated surface of the QDs and provides close enhancement to QDs as the ZnS coating. With the carefully selected stable organic molecules and organometalic molecules, the surface modified QDs have shown highly improved quantum yields and photo checmial stability. Furthermore, the air-stable organic molecules could be chosen as dual-surfactants to offer additional enhanced surface protection and air stability for even ZnS coated quantum dots. Since the organic coating process may be through a ligands exchange process without the problem of lattice mismatch, the method could be applied for any shape of the quantum dots, offering this method a much more general application than the inorganic coating. Especially, the molar ratio of the first of capping molecules to the second type of capping molecules is in the range of 0.8-1.2 (i.e. 8:10-12: 10), even more especially 0.9-1.1, yet even more especially 0.95-1.05. For instance, 1.05 mole of zinc undecylenate and 1 mole of hexadecylamine give a molar ratio of 1.05.

The second functional group of the first type of capping molecule and second type of capping molecule may be different. However, in a specific embodiment, the second functional group of the first type of capping molecule and the second functional group of the second type of capping molecules are the same. For instance, $NH_2$—[—$Si(CH_3)_2$—O—]$_n$—$CH_3$ and Zn(OOC—[—$Si(CH_3)_2$—O—]$_n$—$CH_3)_2$ may be applied as capping molecules.

Matrixes, i.e. solid polymers may for instance be chosen from the group consisting of PE (polyethylene), PP (polypropylene), PEN (polyethylene napthalate), PC (polycarbonate), polymethylacrylate (PMA), polymethylmethacrylate (PMMA) (Plexiglas or Perspex), cellulose acetate butyrate (CAB), silicone, polyvinylchloride (PVC), polyethyleneterephthalate (PET), (PETG) (glycol modified polyethyleneterephthalate), PDMS (polydimethylsiloxane), and COC (cyclo olefin copolymer), but especially silicones and poly(methyl)methacrylates, even more especially silicones, are applied.

As suggested above, the process of the invention may provide a luminescent polymeric article comprising a solid polymer with in the polymer article embedded luminescent nano particles with an outer surface coated with capping molecules comprising a first functional group and a second functional group. As indicated above, the polymeric article may for instance be transparent or translucent. The process of the invention may lead in an embodiment to a product wherein at least part of the second functional group of at least part of the capping molecules is interwoven with polymer chains of the solid polymer and/or in an embodiment to a product wherein the second functional group of at least part of the capping molecules is part of a polymer chain of the solid polymer. The latter embodiment may be the case when the second functional group may be able to react with the precursor of the solid polymer.

As indicated above, the capping molecules may in an embodiment comprise two type of capping molecules, wherein the first functional group of the first type of capping molecule has a metal center functionality and wherein the first functional group of the second type of capping molecule has Lewis base functionality. Especially, the molar ratio of the first type of capping molecules to the second type of capping molecules is in the range of 0.8-1.2. In this way, a substantial part of the quantum dot may be covered with the first type of capping molecules and second type of capping molecules.

Further, as stated above, the invention also provides a lighting unit comprising (i) a light source configured to generate light source light and (ii) a light converter configured to convert at least part of the light source light into converter light, wherein the light converter comprises the solid polymer obtainable according to the process as defined herein or the polymeric article as defined herein. It may be advantageous, in view of efficiency and/or stability, to arrange the nano particles at a non-zero distance from the light source. Hence, in an embodiment, the light converter material may be configured at a non-zero distance of the light source. For instance, the light converter material, or especially the luminescent material, may be applied to or may be comprised by a window of the lighting unit. In case the light source is configured to provide blue light, the luminescent material may be configured to convert only part of the light source light. The blue light of the light source and the luminescent material light of the luminescent nano particles based luminescent material together may in an embodiment provide white lighting unit light.

In a further embodiment, the light source comprise a solid state light source, such as a solid state light emitting device or solid state laser. The term light source may also relate to a plurality of light sources.

The term white light herein, is known to the person skilled in the art. It especially relates to light having a correlated color temperature (CCT) between about 2000 and 20000 K, especially 2700-20000 K, for general lighting especially in the range of about 2700 K and 6500 K, and for backlighting purposes especially in the range of about 7000 K and 20000 K, and especially within about 15 SDCM (standard deviation of color matching) from the BBL (black body locus), especially within about 10 SDCM from the BBL, even more especially within about 5 SDCM from the BBL.

The terms "violet light" or "violet emission" especially relates to light having a wavelength in the range of about 380-440 nm. The terms "blue light" or "blue emission" especially relate to light having a wavelength in the range of about 440-490 nm (including some violet and cyan hues). The terms "green light" or "green emission" especially relate to light having a wavelength in the range of about 490-560 nm. The terms "yellow light" or "yellow emission" especially relate to light having a wavelength in the range of about 560-590 nm. The terms "orange light" or "orange emission" especially relate to light having a wavelength in the range of about 590-620. The terms "red light" or "red emission" especially relate to light having a wavelength in the range of about 620-750 nm. The terms "visible" light or "visible emission" refer to light having a wavelength in the range of about 380-750 nm.

The term "substantially" herein, such as in "substantially all emission" or in "substantially consists", will be understood by the person skilled in the art. The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The mere fact that certain measures are recited in mutually different dependent claims does not indicate that a combination of these measures cannot be used to advantage.

The invention further applies to a device comprising one or more of the characterizing features described in the description and/or shown in the attached drawings. The invention further pertains to a method or process comprising one or more of the characterising features described in the description and/or shown in the attached drawings.

The various aspects discussed in this patent can be combined in order to provide additional advantages. Furthermore, some of the features can form the basis for one or more divisional applications.

BRIEF DESCRIPTION OF THE DRAWINGS

Embodiments of the invention will now be described, by way of example only, with reference to the accompanying schematic drawings in which corresponding reference symbols indicate corresponding parts, and in which.

The drawings are not necessarily on scale.

DETAILED DESCRIPTION OF THE EMBODIMENTS

Figure 1A:
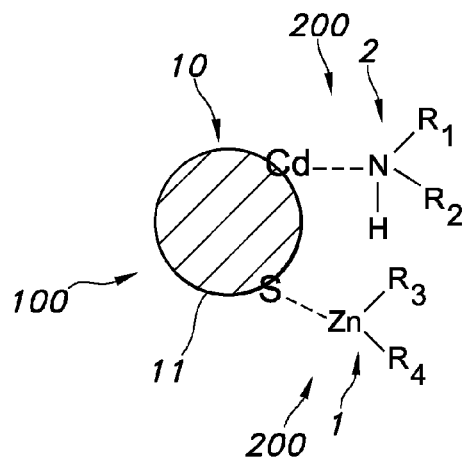
FIGS. 1a-1d schematically depict some aspects of the invention.

FIG. 1a schematically depicts a quantum dot particle 10, in this embodiment based on CdS. This implies that at the surface of the QD particle 10, indicated with reference 11, cadmium and sulfur ions are present. Capping molecules coordinate the surface 11 of the QD particle 10. Those capping molecules are indicated with reference 200. Here, two types of capping molecules are applied, which are indicated with references 1 and 2, respectively. The first type ligand, $M^{n+}R_n$, is indicated with reference 1. Here, M is zinc (Zn), and R3 and R4 are used to indicate that the two hydrocarbons R may be different. However, R3 and R4 may also be identical. The second type of organic ligand comprise an organic Lewis base, and is indicated with reference 2. Here, an amine is used, with R1, R2 and H. Instead of H, also a further hydrocarbons may chosen. The first type ligand coordinates to sulfur; the second coordinates to cadmium. In this way, a ligand coated semiconductor based luminescent quantum dot is provided, which is indicated with reference 100. Note that reference 10 refers to the "bare" quantum dot (with or without a shell), and the reference 100 refers to the coated quantum dot.

Figure 1B:
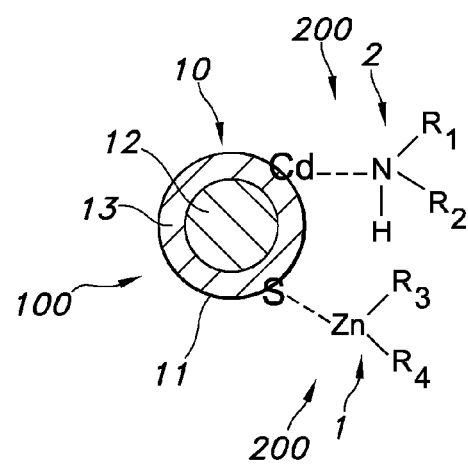

FIG. 1b schematically depicts the same embodiment of the ligand coated semiconductor based luminescent quantum dot 100 as depicted in FIG. 1a, with the difference that the quantum dot 10 is now a core-shell quantum dot. The core is indicated with reference 12; the shell is indicated with reference 13. The core 12 may for instance be CdSe and the shell 13 may for instance be CdS.

Figure 1C:
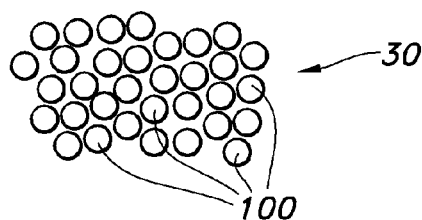

FIG. 1c schematically depicts a plurality of ligand coated semiconductor based luminescent quantum dot, i.e. a luminescent material 30.

Figure 1D:
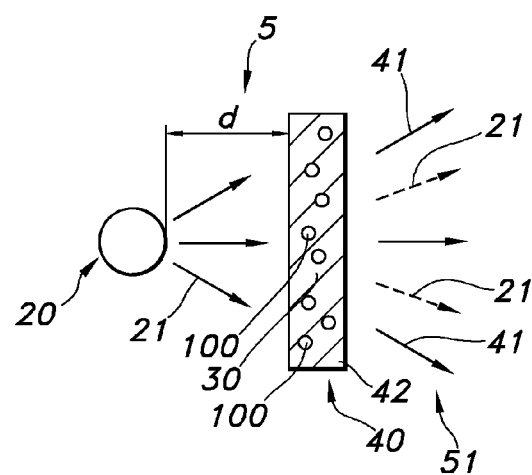

This luminescent material may be applied in a lighting unit 5, as schematically depicted in FIG. 1d. Here, lighting unit 5 comprises a light source 20, configured to generate light source light 21, and a converter 40, configured to convert at least part of the light source light 21 into converter light 41. To this end, the converter may comprise (including consist) of the luminescent material 30, may essentially consist of the ligand coated semiconductor based luminescent nano particles 100. Optionally, the converter 40 may comprise further material 42. For instance, the converter may be a polymeric foil or plate, embedding the luminescent material 30. The converter 40 may especially be arranged at a non-zero distance d from the light source 20, which may for instance be a light emitting diode, although the distance d may also be zero, for instance when the luminescent material 30 is applied on a LED die or embedded in a (silicone) cone on the LED die. The converter may optionally allow at least part of the light source light 21 penetrate through the converter. In this way, downstream of the converter, a combination of converter light 41 and light source light 21 may be found. The light downstream of the light converter is indicated a lighting unit light 51.

In addition to the ligand coated semiconductor based luminescent nano particles 100, the luminescent material 30 may optionally comprise also other types of luminescent materials, for instance to tune the color of the lighting unit light 51, to increase the color rendering, to tune the color temperature, etc.

The terms "upstream" and "downstream" relate to an arrangement of items or features relative to the propagation of the light from a light generating means (here the especially the first light source), wherein relative to a first position within a beam of light from the light generating means, a second position in the beam of light closer to the light generating means is "upstream", and a third position within the beam of light further away from the light generating means is "downstream".

Figure 2A:
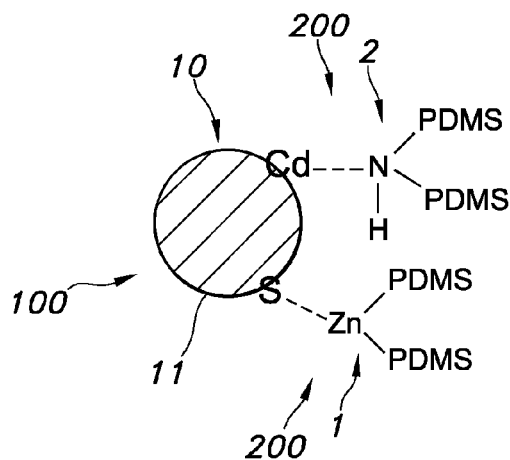
FIGS. 2a-2d schematically depict some further aspects of the invention.

FIG. 2a schematically depicts a coated quantum dot particle 100, wherein both the cation(s) and anion(s) at the surface 11 of the quantum dot 10 are coordinated by capping molecules. By way of example, the first functional groups are Zn and $NH(R)_2$, respectively, and the second functional group(s) are for both capping molecules 200 PDMS. The first ligand 1 may comprise by way of example two PDMS groups, although also only one may be used. The PDMS groups may for instance be functionalized with $COO^-$ (not depicted), to bind to the zinc ion. Note that herein, when more than one R group is present in a compound, the more than one R groups may be identical, but may in an embodiment also differ.

Figure 2B:
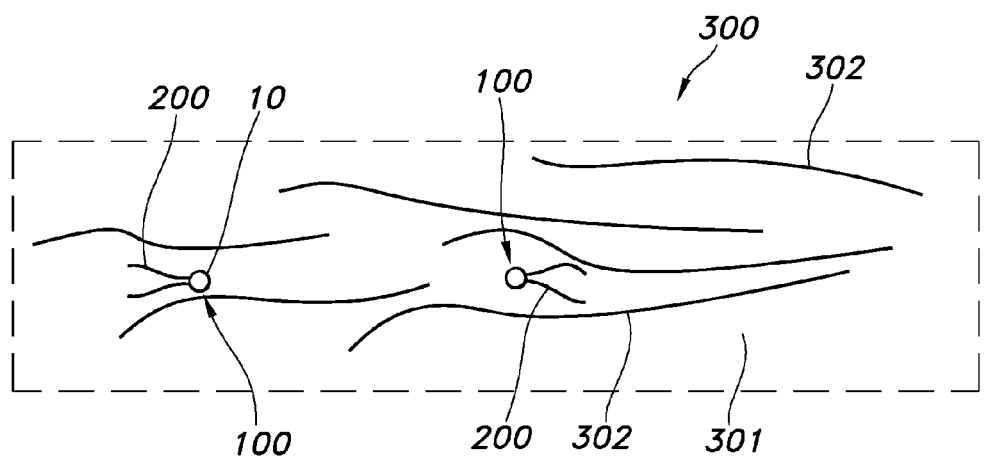

FIG. 2b schematically depicts a polymeric article 300. This article is here depicted as coating, film or plate, but may also have other geometrical properties than depicted. The polymeric article 300 here comprises a body 301. The polymeric article comprises polymer chains 302, such as e.g. PDMS or PMMA. They may be aligned, but may also have other configuration. The nano particles 100 with their ligand(s) 200 are embedded in the polymeric article 300. The capping molecules 200 are in this embodiment interwoven with the polymer chains 302.

Figure 2C:
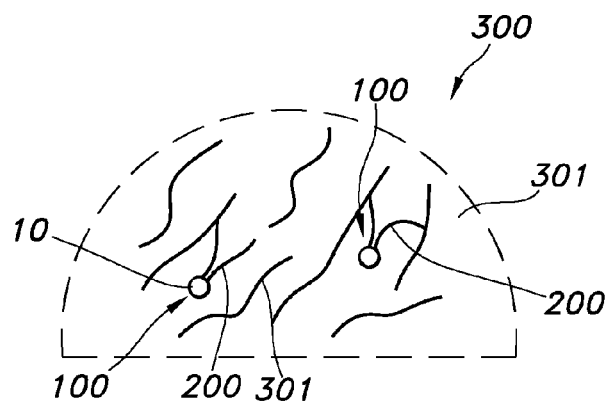

FIG. 2c schematically depicts a further embodiment of a polymeric article 300, with for illustration purposes another geometrical shape (for instance a dome for a LED). Here, the ligand(s) of the nano particles 100 are part one or more polymer chains. Here, during production of the polymeric article, capping molecules have been applied that were able to react with the polymer precursor.

Figure 2D:
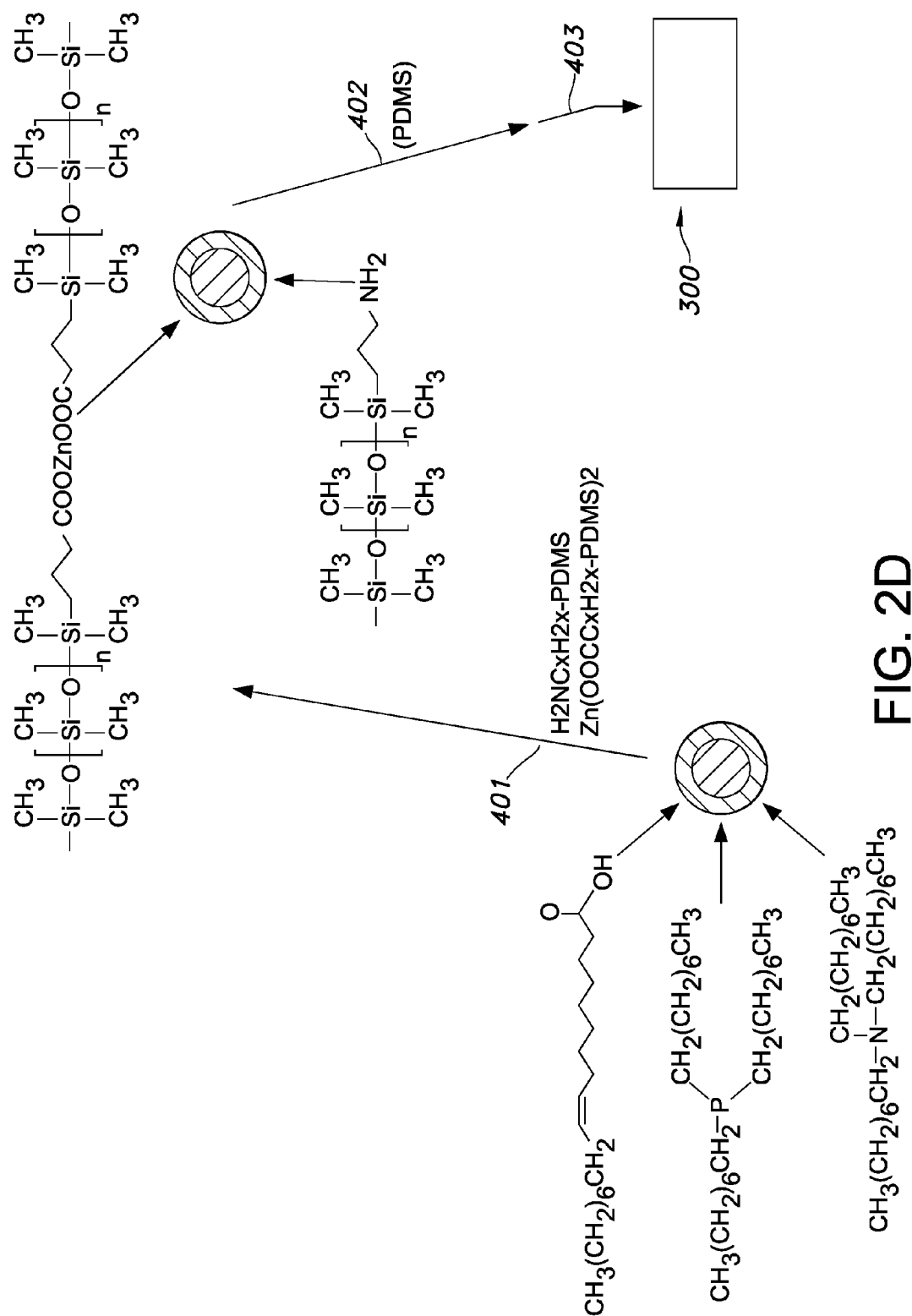

FIG. 2d schematically depicts an embodiment of the process of the invention. However, also other routes may be possible. In this embodiment, a core-shell particle is displayed, but also other types of particles may be applied. In this embodiment, further the particle may have been pre-coated with other capping molecules, as schematically depicted. Hence, first the capping molecules of the invention are applied to the quantum dot. By way of example, two types of capping molecules are applied, which is indicated with reference 401. Then, the particles are combined with the polymer precursor, here by way of example with PDMS monomeric units (for instance containing 2-50 siloxane units), which is indicated with reference 402. Now a mixture of the starting components is obtained, which is subsequently treated to obtain the polymer or polymeric article 300. This process element is indicated with reference 403, and includes in this embodiment a polymerization process wherein the monomeric units polymerize to a polymer/polymeric article, in this embodiment a solid PDMS polymer or polymeric article 300.

EXPERIMENTAL

Capping Molecules Preparation

The zinc and silicone containing surfactants are prepared by reaction of high reactive organomatelic zinc such as diethylzinc and silicone polymer with functional groups such as acid, thiol, etc. that could react with diethylzinc. For example:

Prepare Zn-PDMS capping molecules: diethylzinc+
monocarboxydecyl terminated PDMS $ZnEt_2$+
$PDMS-C_xH_{2x}COOH=(PDMS-C_xH_{2x}COO)_2Zn$ React in toluene for 30 min at room temperature and terminated by $NaHCO_3$ to remove trace of remained $ZnEt2$ and by products. The purified Zn-PDMS are clear or a bit hazy solution at room temperature.

Capping Molecules Exchange: Example

Exchange for a Cd-rich CdSe/CdS QRs: The CdSe/CdS rods are pre-synthesized according to literature (L. Carbone, et al. "Synthesis and micrometer-scale assembly of colloidal CdSe/CdS nanorods prepared by a seeded growth approach" Nano Lett., 2007, 7 (10), 2942-2950). After synthesis, the QRs are purified and re-dissolved in toluene to form a $2.5E''$ M/ml solution.

Dissolved are $2.5E^{-09}$ mol CdSe/CdS rods, 0.2 mmol above synthesized type I capping molecules such as Zn-PDMS, or other commercial organometalic and 0.5 mmol type II capping molecules such as (3-Mercaptopropyl)-trimethoxysilane or mono amino terminated PDMS into 5 ml ODE. The mixture is heated to 150° C. under $N_2$ with stirring; 0.05 mmol dimethylsilylsulfide is injected. The mixture is kept at 150° C. for 30 min then cooled down to room temperature. The QDs are washed with ethanol and toluene for 3 times and re-dispersed in 3 ml toluene.

Prepare QDs-Silicone Matrices:

The surface modified QDs are mixed into silicone matrices through two processes.

Process one: The surface modified QDs are directly mixed into the polymer monomer such as Silres in solvents, and then the QDs polymer mixture is kept at curing temperature to give QDs-polymer matrices after removing solvent.

Process two: the surface modified nano particles are mixed with silicon polymer (components A+B; see below) in solvents such as toluene or chloroform to obtain a clear solution. The solution is transferred into a template vessel. After evaporating the solvents, the nano particles/silicon matrices are kept at curing temperature in air to obtain a solid, transparent film.

Experiment 1
Prepare QDs-Silicone Polymer Matrices as an Example of QDs-Sylgard PDMS:

Dissolve the Zn-PDMS and amino-PDMS modified QDs into the solvents such as toluene or chloroform to form a QDs solution. PDMS component, which contains PDMS monomers, such as Sylgard 184 (component B) are first added into the solution and stirring to give a clear mixture. Then the other component, which contains crosslinker and catalyst, such as Sylgard 184 (component A) A is added into the mixture at a desired weight ratio, in the case of Sylgard 184 the ratio is of 10%. The clear mixture then dried and cured at certain temperature, in the case of Sylgard 184 it is 150° C. for 30 min to give a transparent QDs-PDMS matrix.

Experiment 2
Prepare QDs-Silicone Polymer Matrices as an Example of QDs-Silres:

Dissolve the above zinc undecylate and (3-Mercaptopropyl)-trimethoxysilane modified QDs into the solvents such as toluene or chloroform to form a QDs solution. Silres monomer, such as Silres 610 is added into the mixture at a desired weight ratio. The clear mixture then dried and cured at certain temperature, in the case of Silres 610 it is 200° C. for 30 min to give a transparent QDs-Silres matrix.

Experiment 3
Prepare QDs-Silicone Polymer Matrices as an Example of QDs-Acrylates:

Dissolve the zinc methacrylate modified QDs into the solvents such as toluene or chloroform to form a QDs solution. Acrylates monomers, such as methyl methacrylate are then added into the solution. The mixture then stirred till clear and 1% wt photo initiator is added and then the mixture is cured under UV irradiation to give a transparent QDs-acrylates matrix.

Characterizations:
Material Characterization:

The components and structure of the QDs-silicone polymer composites could be easily detected. The structure could be characterized through the characterization methods of TEM, XRD. Components could be characterized by IR, NMR, UV-Vis, PL, ICPMS and XPS for the type, elements ratio of the components.

Analysis of thiol, amino or carboxydecyl terminated PDMS or Silane is through standard way for commercial product.

Analysis of Zn-carboxy or Zn-amino terminated PDMS or Silane through the standard way plus additional IR, NMR analysis for Zn-containing and ICPMS and XPS analysis for Zn element containing in a washed solution.

Optical Property Characterization:

The quantum yields are measured in an integration sphere using a YAG phosphor powder (95% QEs) as standard and UV-absorption to use for the absorption and transmission of the QDs-PDMS films. One example of the QDs-silicone film has over 90% transparency between 450 nm-700 nm and QEs of maximum 90% when at 0.3% wt QDs in matrices and 100 uM thickness.

It appears that under constant illumination, the luminescent material could reach a high photochemical stability with a decay rate of E-8/s to E-7/s in both air and $N_2$ at 100° C. The quantum efficiency of all capped and embedded nano particles was high, such as at least 80%.

The invention claimed is:

1. A process for the production of a solid polymer with embedded luminescent nano particles, the process comprising:

mixing luminescent nano particles having outer surfaces coated with capping molecules, the capping molecules comprising a first functional group and a second functional group, with a precursor of the solid polymer; and
allowing the solid polymer to be formed, thereby producing the solid polymer with embedded nano particles;
wherein the first functional group is configured to bind to the outer surfaces of the luminescent nano particles and wherein the second functional group has one or more functions selected from the group consisting of being miscible with the precursor of the solid polymer and being able to react with the precursor of the solid polymer,
wherein the capping molecules comprise two types of capping molecules, wherein the first functional group of the first type of capping molecules comprises a metal ion having a coordinating functionality, and wherein the first functional group of the second type of capping molecules has a Lewis base functionality.

2. The process according to claim 1, wherein the second functional group of the first type of capping molecules and the second functional group of the second type of capping molecules are the same.

3. The process according to claim 1, wherein the precursor of a solid polymer comprises monomers that are able to form the polymer upon polymerization.

4. The process according to claim 1, wherein the precursor of the solid polymer comprises a polymer mixed with a solvent.

5. The process according to claim 1, wherein the second functional group is one of a siloxane, a styrene, and an acrylate.

6. The process according to any claim 1, wherein the nano particles are selected from the group consisting of CdS, CdSe, CdTe, ZnS, ZnSe, ZnTe, HgS, HgSe, HgTe, CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, CdZnSeS, CdZnSeTe, CdZnSTe, CdHgSeS, CdHgSeTe, CdHgSTe, HgZnSeS, HgZnSeTe and HgZnSTe.

7. A luminescent polymeric article comprising a solid polymer within the polymer article, wherein the solid polymer contains embedded luminescent nano particles with outer surfaces coated with capping molecules, the capping molecules comprising a first functional group and a second functional group,
wherein the first functional group of a first type of capping molecules comprises a metal ion having a coordinating functionality, and wherein the first functional group of a second type of capping molecules has a Lewis base functionality.

8. The polymeric article according to claim 7, wherein at least part of the second functional group is interwoven with polymer chains of the solid polymer.

9. The polymeric article according to claim 7, wherein at least part of the second functional group is part of a polymer chain of the solid polymer.

10. The polymeric article according to claim 7, wherein the molar ratio of the first type of capping molecules to the second type of capping molecules is in the range of 0.8-1.2.

11. The polymeric article according to claim 7, wherein the second functional group is one of a siloxane, a styrene, and an acrylate.

12. The polymeric article according to claim 7, wherein the nano particles are selected from the group consisting of CdS, CdSe, CdTe, ZnS, ZnSe, ZnTe, HgS, HgSe, HgTe, CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, CdZnSeS, CdZnSeTe, CdZnSTe, CdHgSeS, CdHgSeTe, CdHgSTe, HgZnSeS, HgZnSeTe and HgZnSTe, and wherein the polymeric article is selected from the group consisting of a coating, a self supporting layer, and a plate, and wherein the polymeric article is transmissive for light having a wavelength selected from the range of 380-750 nm.

13. A lighting unit comprising a light source configured to generate light source light and a light converter configured to convert at least part of the light source light into converter light, wherein the light converter comprises a solid polymer or a polymeric article containing embedded luminescent nano particles,
  wherein the luminescent nano particles have outer surfaces coated with capping molecules, the capping molecules comprising a first functional group and a second functional group, and
  wherein the first functional group of a first type of capping molecules comprises a metal ion having a coordinating functionality, and wherein the first functional group of a second type of capping molecules has a Lewis base functionality.

14. A luminescent material comprising a plurality of nano particles,
  wherein the nano particles comprise quantum dot particles, the quantum dot particles comprising outer surfaces coated with capping molecules,
  wherein the capping molecules comprise —[—Si(R)$_2$—O—]$_n$,
  wherein n=1-20,
  wherein R is selected from the group consisting of methyl and phenyl,
  wherein the capping molecules comprise a first type and a second type of capping molecules,
  wherein capping molecules of the first type further comprise a functional group including a metal ion having a coordinating functionality, and
  wherein the capping molecules of the second type further comprises a functional group having a Lewis base functionality.

15. The luminescent material according to claim 14, wherein the molar ratio of the first type of capping molecules to the second type of capping molecules is in the range of 0.8-1.2.

16. The process of claim 1, wherein the luminescent nano particles comprise quantum dots.

17. The lighting unit of claim 13, wherein the second functional group of the capping molecules has one or more functions selected from the group consisting of being miscible with a precursor of the solid polymer or a polymeric article and being able to react with the precursor.

* * * * *